US006876666B1

(12) United States Patent
Engdahl (10) Patent No.: US 6,876,666 B1
(45) Date of Patent: Apr. 5, 2005

(54) METHOD FOR ADAPTATION OF VOICE SAMPLE RATE IN A TELECOMMUNICATION SYSTEM

(75) Inventor: Tomi Engdahl, Espoo (FI)

(73) Assignee: Nokia Networks Oy, Nokia Group (FI)

( * ) Notice: Subject to any disclaimer, the term of this patent is extended or adjusted under 35 U.S.C. 154(b) by 589 days.

(21) Appl. No.: 09/608,945

(22) Filed: Jun. 30, 2000

Related U.S. Application Data (63) Continuation of application No. PCT/EP98/00005, filed on Jan. 2, 1998.

(51) Int. Cl.[7] ............................... H04J 3/16; H04J 3/22
(52) U.S. Cl. ....................................... 370/466; 370/467
(58) Field of Search .............................. 370/236, 465, 370/466, 467, 428, 535

(56) References Cited

U.S. PATENT DOCUMENTS

| | | | | |
|---|---|---|---|---|
| 4,692,894 A | * | 9/1987 | Bemis .......................... | 710/57 |
| 5,521,918 A | * | 5/1996 | Kim ............................. | 370/428 |
| 5,659,541 A | | 8/1997 | Chan | |
| 5,963,153 A | * | 10/1999 | Rosefield et al. ............. | 341/61 |
| 6,108,560 A | * | 8/2000 | Navaro et al. ................ | 455/517 |
| 6,181,711 B1 | * | 1/2001 | Zhang et al. ................. | 370/468 |
| 6,339,596 B1 | * | 1/2002 | Kozaki et al. ............. | 370/395.7 |
| 6,556,560 B1 | * | 4/2003 | Katseff et al. ................ | 370/352 |
| 2002/0159457 A1 | * | 10/2002 | Zhang et al. ................ | 370/391 |

FOREIGN PATENT DOCUMENTS

| | | |
|---|---|---|
| WO | WO 95/22233 | 8/1995 |
| WO | WO 97/32447 | 9/1997 |

OTHER PUBLICATIONS

Abe, et al, "A Traffic Control Method for Service Quality Assurance in an ATM Network", IEEE Journal on Selected Areas In Communications, Feb. 1, 1994, pp. 322–331, XP000458651.

* cited by examiner

Primary Examiner—Ajit Patel
Assistant Examiner—Chirag Shah
(74) Attorney, Agent, or Firm—Squire, Sanders & Dempsey L.L.P.

(57) ABSTRACT

The present invention proposes a method for sample rate adaptation in a telecommunication system comprising the steps of: supplying a first stream (PCM_IN) of data cells via a network (ATM) operated at a first sample rate (CLK_1; CLK_2), passing said data stream through a data modifying means (DOD), outputting said data stream out of said data modifying means (DOD) to a processing element (BUF:_1; BUF_2), storing said output data is said processing element (BUF_2; BUF_1); and outputting said data from said processing element as a second digital data stream (PCM_OUT) at a second sample rate (CLK_2, CLK_1), said first and said second sample rate being different from each other; wherein said method comprises the further steps of detecting a state (BUFFER_STATUS) of said processing element (BUF_2; BUF_1); and controlling said data modifying means (DOD) dependent on the detected state of the processing element (BUF_2; BUF_1). The present invention also proposes a device for sample rate adaptation in a telecommunication system, operating according to such a method.

7 Claims, 6 Drawing Sheets

METHOD FOR ADAPTATION OF VOICE SAMPLE RATE IN A TELECOMMUNICATION SYSTEM

This application is a continuation of international application serial number PCT/EP98/00005, filed Jan. 2, 1998.

FIELD OF THE INVENTION

The present invention relates to a method for adaptation of voice sample rate in a telecommunication system like, for example, a telecommunication system operating according to GSM standard. In a particular example, the method according to the present invention is applicable in a situation when there are two or more synchronous data interfaces in a GSM system, which are not synchronized to each other, carrying voice data and which are linked via a network operating in an asynchronous transmission mode (hereinafter referred to as ATM network).

BACKGROUND OF THE INVENTION

Figure 1:
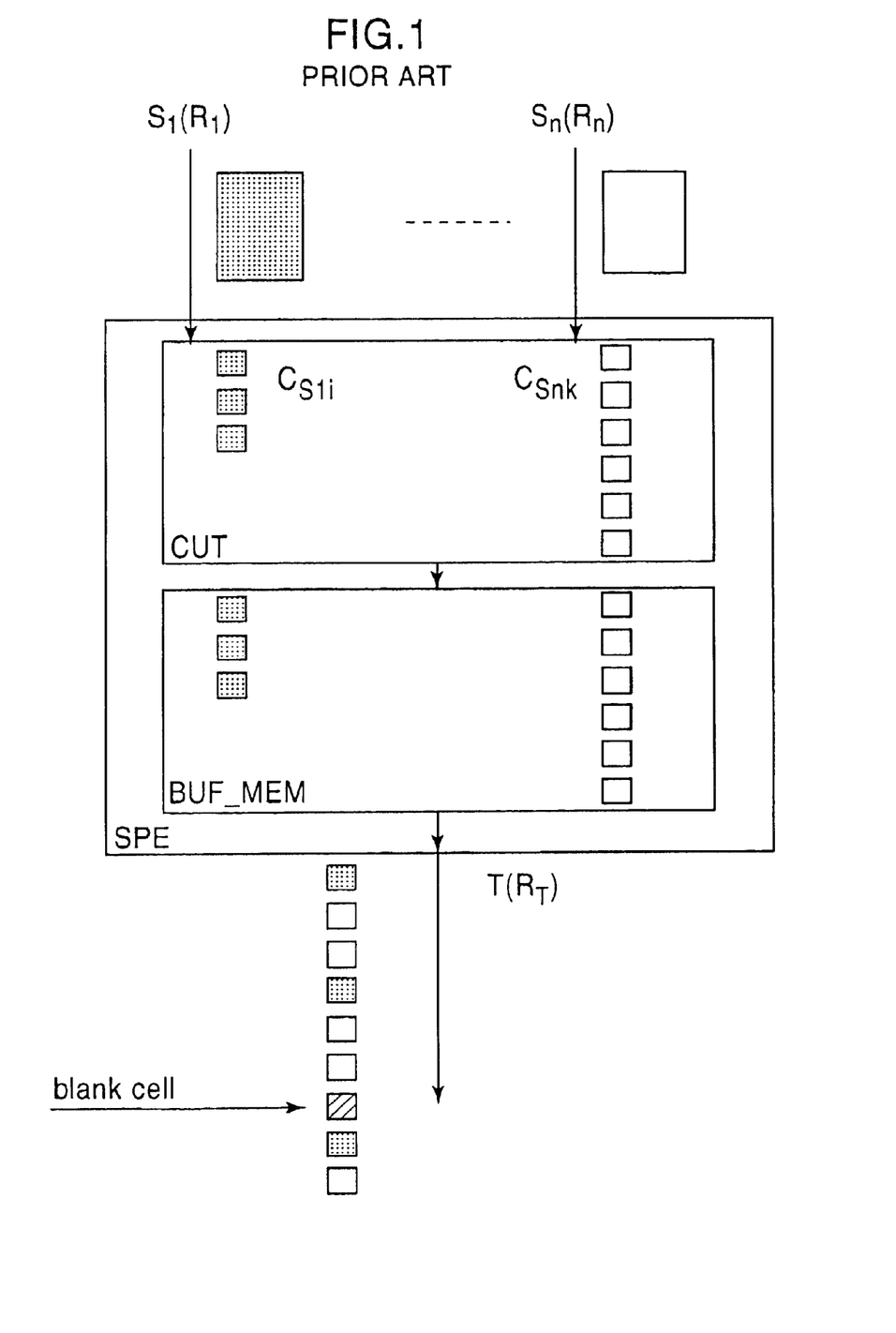
FIG. 1 shows the principle of ATM transmission with reference to the transmitter side.

Generally, as shown in FIG. 1 of the drawings, in an ATM network a plurality of digital data streams $S_1, \ldots, S_n$ having different bit rates $R_1, \ldots, R_n$, respectively, (or at least one data stream having a certain bit rate) are input to a signal processing element SPE, and are output to a transmission path T operated at a further different bit rate $R_T$.

For transmission via the transmission path T, the respective input data streams $S_1, \ldots, S_n$ are "cut" or separated by the signal processing element SPE into a respective plurality of so-called ATM cells $C_{Sli}, \ldots, C_{snk}$ of a predetermined length including cell identifier codes as well as the respective information to be transmitted. The thus obtained ATM cells $C_{Sli}, \ldots, C_{Snk}$ are temporarily stored or buffered in a buffer memory BUF_MEM and output to the single transmission path T operated at the specified bit rate $R_T$. Within the output data stream, the respective ATM cells are alternately transmitted according to the amount of data to be transmitted in the corresponding data streams $S_1, \ldots, S_n$, while in case that no information is to be transmitted, a so-called empty-cell or blank cell (containing no information to be transmitted, but containing a specified sequence of bits representing that the cell is a blank cell) is inserted in the transmitted stream of ATM-cells.

The above mentioned cells transmitted via an ATM network have a standardized cell format as follows: each ATM cell consists of a header portion comprising five octets (or bytes, respectively) containing cell identifier codes, address codes etc., and a payload portion of forty-eight octets as the ATM service data units containing the information to be transmitted.

This principle of ATM transmission as briefly explained above is illustrated in FIG. 1. However, FIG. 1 illustrates the transmitter side only, and a corresponding ("reverted") signal processing has to be conducted at the receiver side. That is, at the receiver side, the received data stream of ATM cells has to be buffered and the ATM cells are rejoined to thereby reconstruct the respective individual data streams on the basis of cell identifier codes of the respective ATM cells included in each header portion.

Such an arrangement at the sender side and the receiver side with a transmission path there between may already be assumed to constitute a (simple) ATM network operating according to the ATM standard. In particular, the bit rate at the sender input side and the bit rate at the receiver output side may be different from each other.

Recently, with the increasing progress in development of mobile communication, in addition to the mere "telephone" feature providing for transmission of audio data, i.e. pulse code modulated (PCM) speech data, an increased customer demand for various other services like information services has developed, which services are also commonly referred to as "value added services". The information respectively provided by such services, however, has to be transmitted at different bit rates depending on the bandwidth required for the transmission of the respective information. Therefore, lately developments also implement the principle of ATM in connection with mobile communication according to the present status of GSM system, to which telecommunication system reference is made by way of example only.

Figure 2:
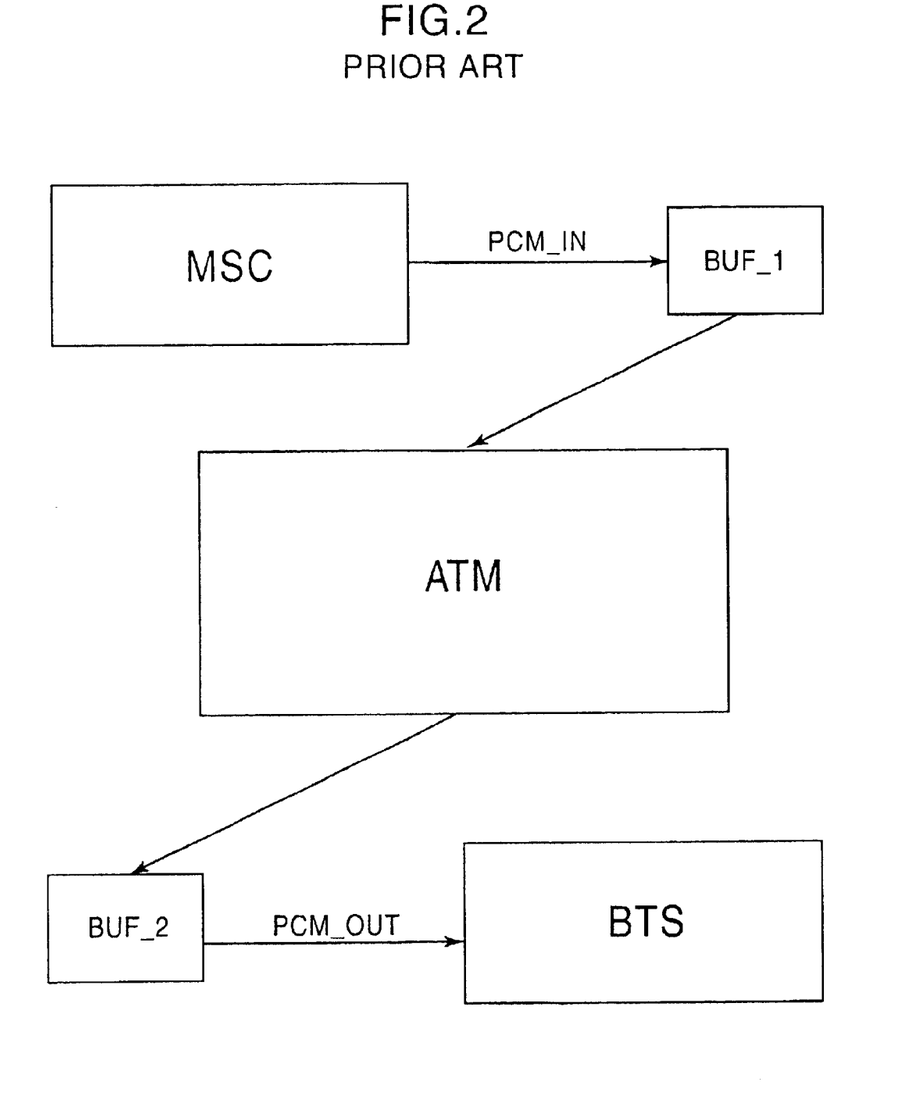
FIG. 2 is a block diagram of an implementation of an ATM link within a GSM network.

FIG. 2 shows a simplified block diagram of an ATM link implemented in a GSM system with the indicated signal transmission direction being depicted for the downlink direction. That is, data output from a mobile switching center MSC via the corresponding MSC interface are transmitted via a PCM link (transmitting for example digital data like digital pulse code modulated speech data (voice data) and being illustrated as a bold arrow) to an associated buffer memory BUF_1. It is to be noted that this buffer memory also effects the conversion of the data received via the PCM link into ATM cells and vice versa (depending on the current signal transmission direction, i.e. uplink or downlink) and thus fulfills the function of the signal processing element SPE explained above with reference to FIG. 1. From the buffer memory BUF_1, the data are transmitted via an ATM link to a receiving side buffer memory BUF_2, which processes the received ATM cells such that the data can be transmitted via an output PCM link and a base transceiver station interface to a base transceiver station BTS. Due to the presence of the ATM link, as explained above, a need for two buffers (buffer memories) arises.

However, since the clock sources of the two PCM links associated to the mobile switching center MSC and the base transceiver station BTS, respectively, are not synchronized at all (the ATM link does not provide for any synchronization), there exists a difference in the clock frequencies of those PCM links. This clock difference (i.e. difference in sampling rate) will cause a buffer overflow or underflow because the data is not leaving the buffer at the same speed it arrives at the buffer.

For the sake of simplification of the further explanations, however, those two buffers connected to each other with an ATM link may be regarded as constituting a single signal processing element or buffer, respectively, which processing element connects two different PCM links PCM_IN and PCM_OUT. This model is shown in FIG. 3A of the drawings.

Figure 3A:
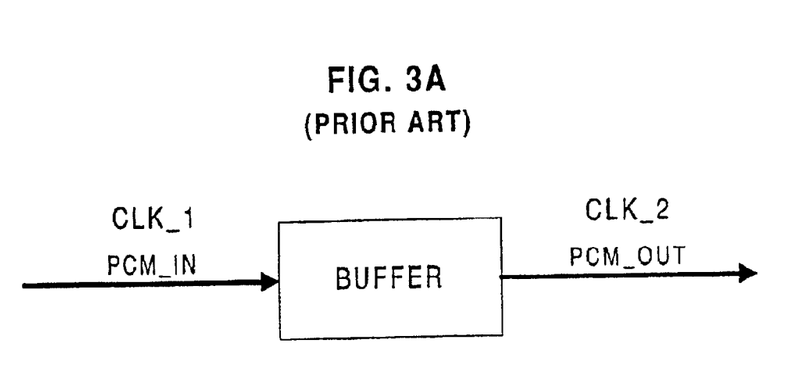
FIG. 3A shows a conventional arrangement of two digital data streams (PCM audio streams) with respective autonomous clocks, being connected to a single signal processing element.

FIG. 3A depicts the situation of two separately, i.e. autonomously clocked PCM data streams clocked with sample rates CLK_1 and CLK_2, respectively, which are not synchronized at all, being connected to a single signal processing element or buffer, respectively. As briefly explained above, the PCM data streams (e.g. audio data streams) are independently clocked in such a way that the clock rates are not exactly the same. Consequently, after a certain time of operation, the buffer gets filled up when the output clock rate CLK_2 of the data stream PCM_OUT is lower than the input clock rate CLK_1 of the data stream PCM_IN. When the output clock rate CLK_2 of the data stream PCM_OUT is faster than the input clock rate CLK_1 of the data stream PCM_IN, the buffer runs out of data after a certain time, i.e. the buffer will become empty.

Stated in other words, as a result of the clock frequency difference between the clock rates CLK_1 and CLK_2, buffering problems such as overflow or underflow of the buffer will occur.

In case of overflow, new data arriving at the buffer will not be stored in the buffer and are therefore lost, resulting in a drawback that information is transmitted incomplete. In case of underflow, temporarily no data are available for transmission to the receiver side, so that the data transmission (or data output) as viewed from the receiver side will be temporarily interrupted.

In any case, even if the clock rates CLK_1, CLK_2 are almost the same and differ only slightly from one another, the above described problems still exist, although they will appear only very rarely.

Figure 3B:
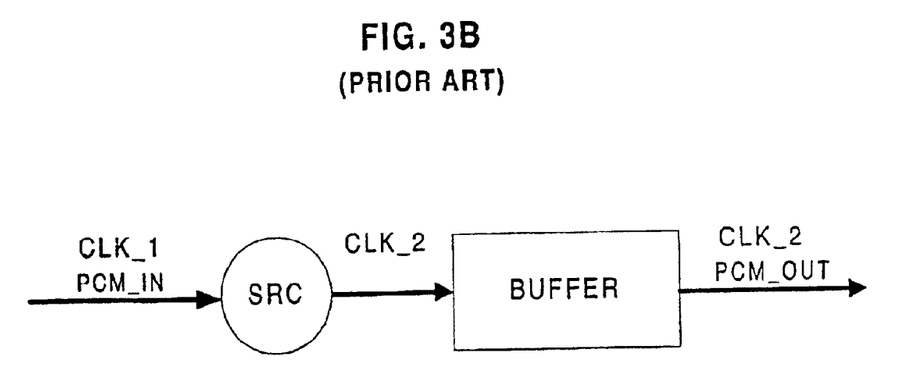
FIG. 3B shows a further conventional arrangement including a sample rate converter for synchronization adaptation of two asynchronous digital data streams being connected to the signal processing element (buffer)

Therefore, a conventionally known possibility to remove the problem was to add a sample rate converter SRC at the input side of the buffer which resamples the input PCM data (or audio data, respectively,) to thereby adapt the input sample raze (or clock rate) CLK_1 to the output sample rate CLK_2. FIG. 3B shows a schematic block diagram depicting such an earlier solution for a PCM—PCM sample rate adaptation.

However, this prior art solution has drawbacks such that an enormous amount of signal processing was required, which due to the data modification, to a certain extent, also influenced sound quality of a transmitted PCM audio stream. In general, it has to be expected that such a solution will adversely affect the quality of transmitted digital signals.

SUMMARY OF THE INVENTION

It is therefore an object of the present invention to provide a method and device for adaptation of sample rate in a telecommunication system which is free from the above drawbacks. In particular, the present invention aims to provide such a method which performs less signal processing while also maintaining the transmission quality, i.e. sound quality in case of transmission of PCM audio signals (voice data).

According to the present invention, this object is achieved by a method for sample rate adaptation in a telecommunication system comprising the steps of: supplying a first stream of data cells via a network operated at a first sample rate, passing said data stream through a data modifying means, outputting said data stream out of said data modifying means to a processing element, storing said output data in said processing element; and outputting said data from said processing element as a second digital data stream at a second sample rate, said first and said second sample rate being different from each other; wherein said method comprises the further steps of detecting a state of said processing element; and controlling said data modifying means dependent on the detected state of the processing element.

Moreover, according to the present invention, this object is achieved by a device for sample rate adaptation in a telecommunication system comprising: a data modifying means, through which a first stream of data cells supplied via a network operated at a first sample rate is passed; a processing element to which said data stream passed through said data modifying means is input and stored, said data being output from said processing element as a second digital data stream at a second sample rate, with said first and said second sample rate being different from each other; wherein said device further comprises a detection means for detecting a state of said processing element; and a control means for controlling said data modifying means dependent on the detected state of the processing element.

Thus, the method and device according to the present invention has the advantages that a need for massive signal processing is removed, while the data transmission quality is maintained at a high level, i.e. a degradation of speech quality is not noticeable. In particular, by using this adaptation method and device, the need for one common clock source or other synchronization for the synchronous interface clocks can be avoided.

Furthermore, the present invention provides the advantage that all data modification and buffer management is handled in the respective receiving end of the transmission path. Additionally, there is no need for any extra traffic between the receiver and the transmitter to take care of the synchronization or to transfer any status information via the ATM link as the transmission network. Consequently, since no extra status information has to be transmitted, less network bandwidth is required (or bandwidth already provided for may be used for other purposes), while also there is no need to define any special data packet format or status bit for transmitting status information between transmitter and receiver. Moreover, the communication between the data modifying means and the processing element is easy to implement since these components typically are located within a same unit of equipment of the system, (although this is not a requirement for the invention to work).

Besides the above mentioned advantages regarding the required hardware, the present invention is advantageous in that discarding and/or duplicating speech frames or data cells, respectively, is an easy operation to implement and does not require significant signal processing power. In addition, discarding and/or duplicating of speech frames is effected only on silent frames (empty frames) whenever possible, with the result that the quality of transmitted signals (speech) is maintained at an optimum (small changes in the duration of silent periods in speech will remain unnoticeable).

Advantageous further developments of the present invention are as set out in the dependent claims.

BRIEF DESCRIPTION OF THE DRAWINGS

In the following, the invention will be described in greater detail by way of example with reference to the accompanying drawings in which.

DESCRIPTION OF PREFERRED EMBODIMENTS

Preferred embodiments of the present invention are described herein below in detail with reference to the drawings.

In particular, the present invention makes use of the fact that the sample rates or clock rates at the transmitted input and output digital data streams (PCM audio streams) CLK_1, CLK_2 are almost identical, so that modifications in the transmitted data can be reduced significantly. Based thereon, the present invention starts from the idea to continue without modifying the transmitted data until the buffer starts to be filled up, i.e. is nearly full, or starts to run out of data too much, i.e. is nearly empty.

When either one of the above indicated situations occurs, a data dropping or duplication means DOD (constituting a data modifying means) is rendered operative to thereby modify the data. That is, as long as none of the above described "nearly full" or "nearly empty" situations is present, the data dropping or duplication means DOD is inactive and input data is passed unchanged to the output. The data dropping or duplication means is only operative in case one of the above mentioned two situations is detected, in response to which detection the data dropping or duplication means is rendered operative. Stated in other words, in order to carry out the above described control of the data dropping or duplication means, a feedback control loop from the buffer to the data dropping or duplication means is implemented.

Figure 4:
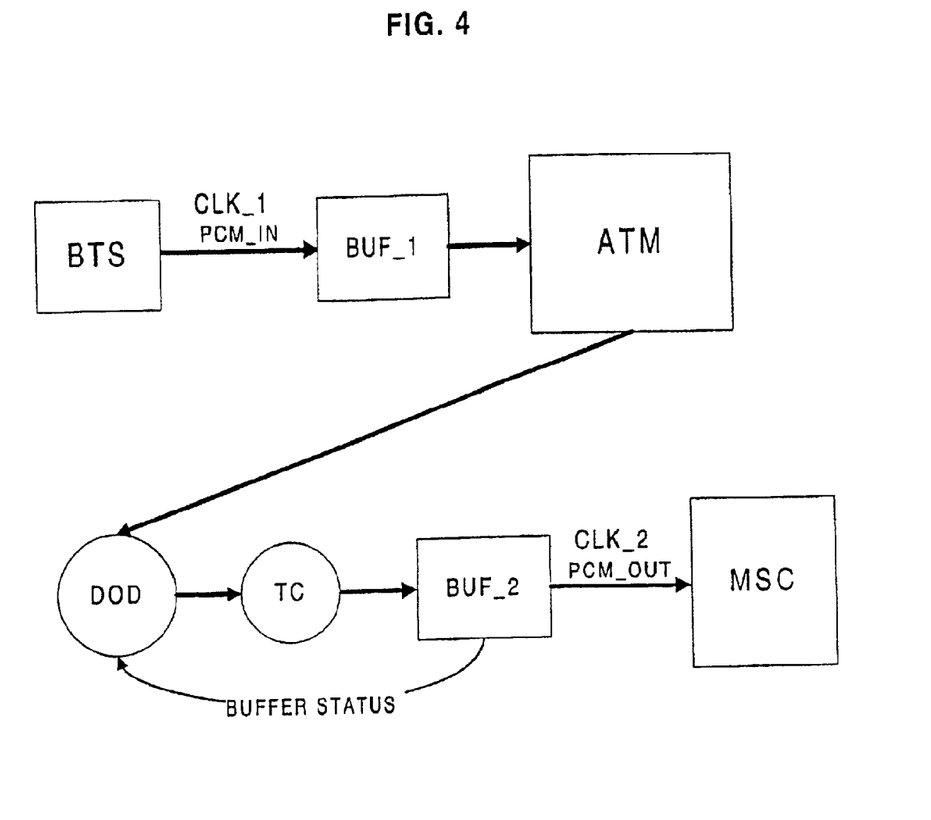
FIG. 4 illustrates a block diagram of an embodiment of the present invention in uplink direction from a base transceiver station to a mobile switching center within an ATM based GSM network.

FIG. 4 illustrates an embodiment of the present invention implementing such a feedback control loop for controlling the data dropping or duplication means in uplink direction from a base transceiver station BTS to a mobile switching center MSC within an ATM based GSM network, which is referred to as an example for a telecommunication system to which the present invention is applicable.

As shown in FIG. 4, a first digital data stream PCM_IN consisting of e.g. PCM audio data (voice data), being transmitted at a first sample rate CLK_1, is supplied to a buffer BUF_1 connected to an ATM network. The buffer BUF_1 as a processing element converts the input PCM audio data stream into ATM cells for transmission via an ATM network connected to a buffer output port.

According to GSM, the speech data is transmitted in data frames called TRAU frames. A TRAU frame according to GSM is a standard frame for storing compressed speech and some other information like signaling and framing information. Each TRAU frame is transmitted over ATM network, so the TRAU frame data is transmitted within an ATM cell (comprising 48 octets). In full rate speech coding according to GSM (13 kBit/s) a TRAU frame includes 20 ms of speech data (1/50 of a second). Further, in case the speech data being RPE-LTP coded (RPE-LTP=regular pulse excited–long term predicted), 160 data samples (e.g. of voice data) are present within these 20 ms, the samples being obtained by decoding a GSM speech frame at the transcoder side.

At the receiving side of the ATM network, the ATM cells or TRAU frames, respectively, are supplied to a data dropping or duplication means DOD (a data modifying means) which performs dropping or duplication in units of frames (or cells) of input TRAU frames (or ATM cells, respectively), or is inoperative (idle) and merely passes the received data without being modified to its output. The respective mode of operation of the data dropping or duplication means DOD is controlled by a signal BUFFER_STATUS indicating the status of the buffer BUF_2, to which buffer the data are fed from an output of the data dropping or duplication means DOD via an intermediate transcoder TC. The transcoder decodes the supplied GSM speech frames (TRAU frames containing voice samples) into 160 samples per 20 ms speech. The decoded data are fed to the buffer BUF_2, where they are temporarily stored, before they are output via a PCM link PCM_OUT operated at a second clock rate CLK_2 to a mobile switching center MSC for further processing/transmission purposes.

Normally, the data dropping or duplication means DOD is inoperative and the speech data (TRAU frames/ATM cells) are passed through the data dropping or duplication means DOD without any modification. If, however, the buffer BUF_2 starts to be filled too much, i.e. is detected by a detection means (not shown) as being nearly full, the data dropping or duplication means DOD is controlled by a control means (not shown) to discard (drop) one TRAU frame of data before the same is being supplied to the transcoder to thereby free up space (20 ms) for audio data in the buffer. Similarly, if the buffer starts to run out of data, i.e. is detected by the detection means as being nearly empty, the data dropping or duplication means DOD is controlled by the control means to duplicate one TRAU frame (or cell, respectively,) such that it is supplied twice to the transcoder.

Accordingly, data transmission continues without modifying the transmitted data until the buffer starts to be filled up, i.e. is nearly full, or starts to run out of data too much, i.e. is nearly empty. When either one of the above indicated situations occurs, the data dropping or duplication means DOD is rendered operative to drop or duplicate at least one data cell, thereby hardly influencing the data as such or at least to a very small extent only, which assures a high signal transmission quality (the sound quality in case of PCM audio data being transmitted).

Figure 5:
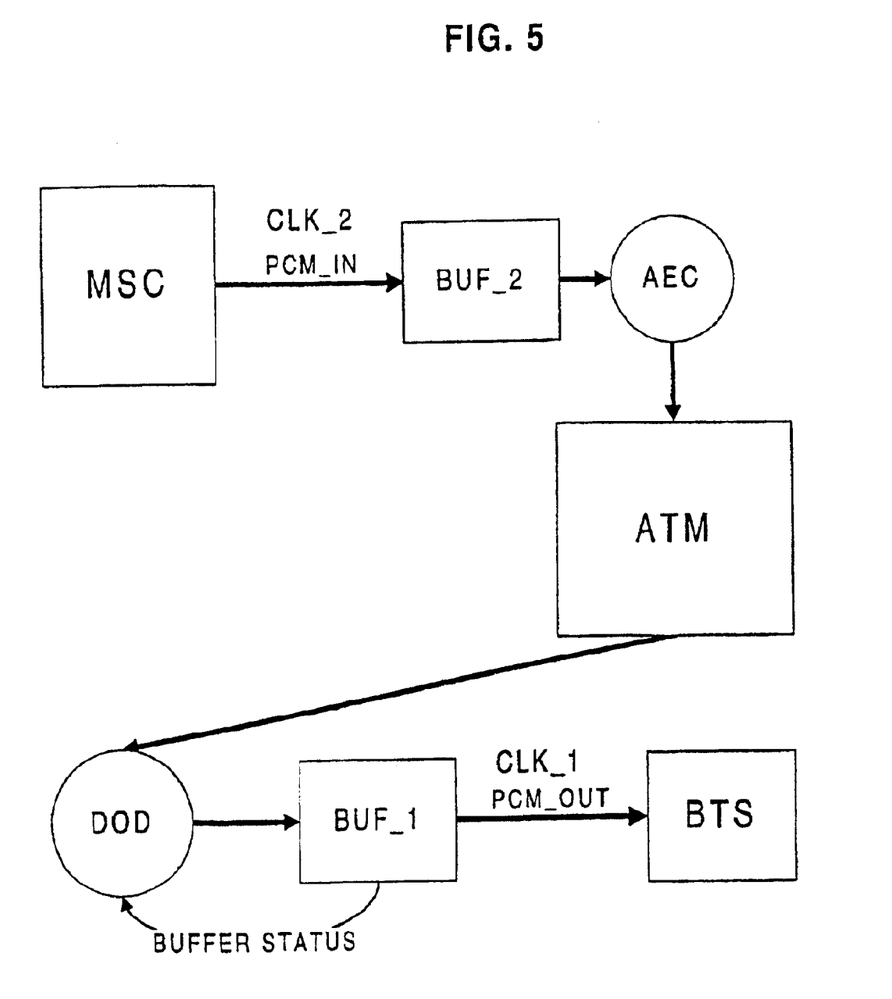
FIG. 5 illustrates a block diagram of an embodiment of the present invention in downlink direction from a mobile switching center to a base transceiver station within an ATM based GSM network.

FIG. 5 shows an embodiment of the present invention as implemented in the downlink direction from a mobile switching center MSC to a base transceiver station BTS. The downlink from the mobile switching center MSC to the base transceiver station BTS works basically in the same way as the uplink described herein above. The only difference resides in the fact that the buffer (BUF_1 at the reception side) does not hold voice samples but the octets taken from the ATM cell, i.e. the TRAU frame to be transferred through a PCM link PCM_OUT to the base transceiver station BTS. This difference is indicated in the block diagram shown in FIG. 5 in that an audio encoder AEC is provided at the ATM network input side (sender side), and that at the ATM network output side, the transcoder is omitted.

The buffer status generation and the TRAU frame discarding or duplication by said data dropping or duplication means DOD can be effected in the same way as in the uplink situation by evaluating the status of the buffer BUF_1 and feeding back the obtained status signal BUFFER_STATUS to the data dropping or duplication means DOD as the data modifying means, to thereby establish feedback control.

As described above, whether in downlink or uplink situation, the control of the data dropping or duplication means DOD by the control means is achieved based on the control signal BUFFER_STATUS indicating the status of the buffer, i.e. whether the buffer is nearly full or nearly empty. The control signal BUFFER_STATUS is variable over time t depending on the amount of data currently stored in the buffer. According to the respective current value of this signal BUFFER_STATUS the data dropping or duplication means DOD is disabled or enabled, thereby switching between outputting the input digital signal unchanged or modified such that coded voice data are selectively discarded or duplicated.

In the following, the generation of the BUFFER_STATUS signal as the signal indicating the buffer status is explained with reference to FIG. 6.

Figure 6:
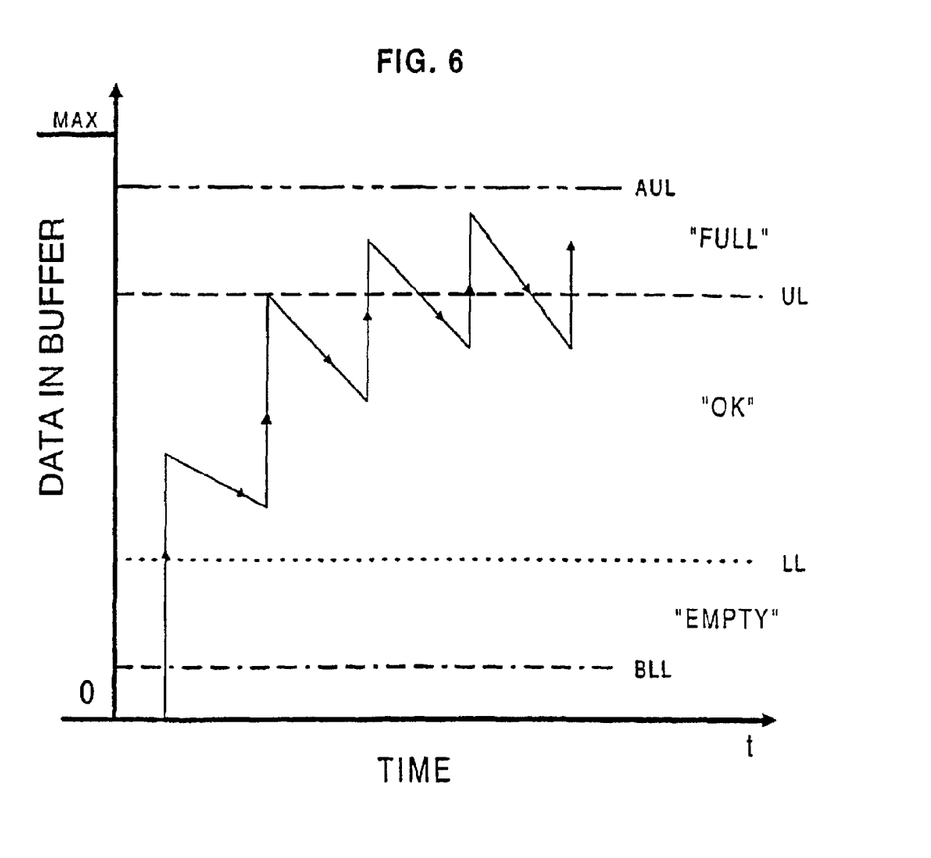
FIG. 6 depicts a graph exemplifying how the buffer status is obtained dependent on the amount of data temporarily stored in the buffer.

FIG. 6 is a graph exemplifying the change of the amount of data stored in the buffer as a function of the lapse of time t. At the beginning of data transmission, the buffer is assumed to be empty. In the course of data transmission the buffer is being filled corresponding to the sample rate at the buffer input side (first sample rate), i.e. CLK_1 in case of uplink transmission according to FIG. 4, CLK_2 in case of downlink transmission according to FIG. 5, while simultaneously the buffer is being read out corresponding to the sample rate at the buffer output side (second sample rate), i.e. CLK_2 in case of uplink transmission according to FIG. 4, CLK_1 in case of downlink transmission according to FIG. 5.

During this data write/read process, the detection means (not shown) associated to the buffer monitors the status of the buffer, i.e. detects whether the buffer is nearly full or nearly empty. The detection of these buffer states is achieved by evaluating the amount of data stored in the buffer. That is, the detection means compares the currently stored amount of data in the buffer with an upper limit UL and with a lower limit LL of stored data amount.

In case the amount of stored data exceeds (or is above) the (predetermined) upper limit UL, the detection means generates a status information informing that the buffer is becoming too full and/or is nearly full and sets the buffer status signal BUFFER_STATUS to a corresponding first value, thereby rendering the data dropping or duplication means DOD operative to reduce the amount of data to be stored in the buffer by dropping or discarding at least one of received TRAU frames, thereby preventing the occurrence of a buffer overflow accompanied by a loss of further incoming data.

In case the amount of stored data falls (or is) below the (predetermined) lower limit LL, the detection means generates a status information informing that the buffer is becoming too empty and/or is nearly empty and sets the buffer status signal BUFFER_STATUS to a corresponding second value, thereby rendering the data dropping or duplication means DOD operative to increase the amount of data to be stored in the buffer by duplicating at least one of incoming TRAU frames, thereby preventing the buffer from becoming empty and preventing the transmission from being interrupted.

In case the detected amount of data is found to be between the lower limit LL and the upper limit UL, the detection means sets the signal BUFFER_STATUS to a corresponding third value rendering the data dropping or duplication means DOD inoperative to thereby merely pass the input data unchanged (without dropping or duplicating TRAU frames) to the buffer. The above described different buffer states represented by the first through third values of the signal BUFFER_STATUS are labeled in FIG. 6 as "Full", "EMPTY", and "OK" state, respectively. The values for the predetermined upper and lower limits UL, LL may be defined according to the specific application as will be explained further below.

In the foregoing, the determination of the buffer status has been described, which status signal controls the operation state of the data dropping or duplication means DD. In the following, the respective operation modes thereof are described in more detail.

In case the buffer starts to be filled up and the "Full" state is detected (the amount of data stored in the buffer is above or exceeds the upper limit UL), the data dropping or duplication means DOD is rendered operative in order to reduce the amount of data to be stored in the buffer by dropping at least one of received TRAU frames until normal operation values are reached again, i.e. until the "OK" state is detected again when the amount of data stored in the buffer falls below the upper limit UL again. In this operation state, one or more TRAU frames are removed from the stream of incoming frames of digital data.

In case the buffer starts to run out of data and the "Empty" state is detected (the amount of data stored in the buffer falls below or is below the lower limit LL), the data dropping or duplication means DOD is rendered operative in order to increase the amount of data to be stored in the buffer until normal operation values are reached again, i.e. until the "OK" state is detected again when the amount of data stored in the buffer exceeds (or is above) the lower limit LL again. In this operation state, one or more TRAU frames within the stream of incoming frames are duplicated and thereby added to the incoming stream of digital data, thus preventing the buffer from actually becoming empty.

The above described principle of the present invention of dropping (discarding) or duplicating TRAU frames depending on a detected buffer state subsequent to the detection of the respective state does not deteriorate the speech quality. That is, since the clock rates (sample rates) or clock frequencies, respectively, do not differ significantly, the TRAU frames are dropped or duplicated only very rarely, so that the degradation of the speech quality is not noticeable due to the redundancy contained in speech. Moreover, even in normal GSM phone operation, it is a quite normal phenomenon that some of transmitted TRAU frames get lost on the radio link, and the GSM system may also cope with additional artificial disturbance.

However, if for some reason TRAU cells or TRAU frames, respectively, would be required to be dropped or duplicated more often, it may no longer be suitable to drop or duplicate the immediately following TRAU frame upon the detection of the "FULL" or "EMPTY" state of the buffer, respectively.

Consequently, according to a preferred embodiment of the present invention, silent TRAU cells are dropped or duplicated according to the need to further suppress the effect of speech quality degradation. To this end, in addition to the detected state of the buffer, the type of the respectively received TRAU cells has to be monitored (detected). That is, when the buffer status signal BUFFER_STATUS represents "Full" or "Empty", thereby indicating that at least one cell has to be dropped or duplicated, respectively, the system does not only simply drop/duplicate the immediately following next cell (as in the foregoing description), but waits until the subsequent silent TRAU cell is received to be dropped/duplicated. Such a silent TRAU cell corresponds to a blank ATM cell.

The detection whether a received TRAU cell is a silent cell may be effected by monitoring a predetermined part of the five header octets indicating the type of data transmitted. According to ATM standard, a two bit flag PT indicating the payload type is part of the header, and based on the detection of a predetermined value of the flag PT, an empty or silent cell (TRAU frame) may be detected.

Alternatively, the detection as to whether the received cell is a silent cell may be made by checking the payload octets (48 bytes). In case of an empty cell or silent cell, respectively, these 48 bytes contain a predetermined bit sequence or bit pattern representative of the silent TRAU cell. Then, the received payload octets are compared with the predetermined bit sequence representing the silent cell and in case the result of comparison yields a coincidence between received bit sequence and the predetermined bit sequence, the respective TRAU cell may be dropped or duplicated according to the detected state of the buffer.

However, for the event that the above described preferred embodiment performing dropping/duplicating of silent TRAU frames is implemented, such a system should further preferably be equipped with a safety function preventing buffer problems even to arise or at least to become too severe, if the number of received silent cells or frames to be dropped/duplicated is too small.

The core of the safety function resides in the fact that if no silent frames are present to be dropped/duplicated, then any TRAU frame or cell may be dropped/duplicated, as in the basic embodiment described above.

The decision whether irrespective of the type of the cell any TRAU frame is to be dropped/duplicated is based on the detection that no silent frame is available for this purpose. To this end, upon detection of a buffer "FULL" or "EMPTY" state, a timing means may be triggered, which monitors for a predetermined time of an integer multiple of the time required for one cell (n*20 ms), whether a silent cell is received during this time interval of n*20 ms or not. If a silent cell is received during this time interval, while the buffer status indicates "FULL" or "EMPTY", then the received empty (silent) cell is dropped or duplicated, respectively. If, however, no silent cell is detected during this time interval, then any TRAU cell may be dropped/duplicated immediately after the time interval has lapsed. Alternatively, since each TRAU cell corresponds to a fixed period of time (20 ms), instead of the timing means a counting means may be provided which counts a predetermined number of received TRAU cells. Similarly, if a silent cell is received and detected among the predetermined number of cells, while the buffer status indicates "FULL" or "EMPTY", then the received and detected empty (silent) cell is dropped or duplicated, respectively. If, however, no silent cell is detected among the predetermined number of cells, then any TRAU cell may be dropped/duplicated immediately after the predetermined number of cells have been received.

A further alternative of implementing the desired safety feature resides in further monitoring the amount of data stored in the buffer, by comparing the data amount stored with respective additional threshold levels or limits, respectively.

That is, with reference to FIG. 6, two further limits are defined, one limit AUL representing a limit (or threshold) above the upper limit UL, and one limit BLL representing a limit below the lower limit LL. It is to be noted that the respective limits are selected such that the following relation holds:

MAX>AUL>UL>LL>BLL>0, with MAX being the maximum buffer memory storage capacity.

Then, in case the amount of data stored in the buffer exceeds (or is above) the upper limit UL and the "Full" state is detected, at least one of received silent cells is dropped. If, however, no silent cell is present in the received stream of cells, then the amount of data will further increase and after a certain time also exceed the limit AUL above the upper limit UL. In response to the latter detection, the system will then start to immediately drop any cell irrespective of its type and contents in order to reduce the amount of data stored in the buffer.

This reduction of data to be stored by dropping any cell may be performed until the data amount falls below the AUL limit again and may then be continued by dropping silent cells only. Alternatively, also hysteresis may be implemented and dropping of any cell may be continued until the amount of data falls below the upper limit UL again, after which the cell dropping and duplication means is rendered inoperative again.

The same description as given above also holds for the duplication of silent cells in case the amount of data in the buffer falls (or is) below the lower limit LL. Upon detection of the "Empty" state, at least one of received silent cells is duplicated in order to increase the amount of data stored in the buffer. If, however, no silent cell is available for duplication and the data amount stored in the buffer decreases further, subsequently falling below the limit BLL below the lower limit LL, then immediately any TRAU cell is duplicated. The duplication of any cell may be performed until the amount of data stored in the buffer exceeds again the limit BLL below the lower limit, followed by duplication of silent cells only.

Alternatively, also in this case, hysteresis may be implemented such that duplication of any cell is performed until the lower limit LL of stored data is exceeded again, after which the cell dropping and duplication means is rendered inoperative again.

The choice as to whether control is effected with or without hysteresis as described above depends on whether more safety is desired in terms of overflow/underflow (hysteresis control), or whether the voice data degradation is desired to be reduced in the best possible way (without hysteresis control).

In any case, the control scheme utilizing the additional thresholds AUL, BLL is further advantageous in that no special means for identifying the received TRAU frames/ATM cells, no frame counting means and/or no timing means have additionally to be provided for.

The values for the predetermined upper and lower limits AUL, UL, LL, BLL, and the buffer storage capacity MAX may be defined according to the specific application. These limits set the values for maximum and minimum delays which the buffer causes to the system. Those should be set such that normal network delay variations do not start the data modification (i.e. discarding or duplication). The limits should be set such that network variations, i.e. variations in the processing speed of the network, do not cause the buffer becoming empty or do not cause a buffer overflow. This means that a sufficient safety marginal from upper limits AUL, UL to the possible maximum amount of stored data MAX (determined by the buffer memory capacity) should be set, while also the lower limits BLL, LL should be set sufficiently high above the situation in which the buffer is empty.

In particular, it has to be noted that the amount of data temporarily stored in the buffer is directly proportional to the delay the (transmission) system causes. That is, the more memory capacity the buffer has, the better the system works. However, the more memory capacity is used, the longer are the delays caused. Such long delays are problematic in connection with transmission of voice signals (PCM audio data) and there exists a requirement that the delay in connection with the buffer should be less than 100 ms. Assuming a sound sample rate of 8 kHz, this results in a restriction for the buffer such that 800 sample values are permissible at a maximum. Therefore, in case the maximum delay of 100 ms is acceptable for a specific application, the maximum memory capacity MAX of the buffer may be selected to be slightly larger than one corresponding to 800 samples, while an upper limit AUL and/or UL may be set to a value corresponding to 800 samples stored in the buffer. In cases in which the admissible delay is required to be smaller, the upper limit AUL and/or UL may be set to a lower value, while in order to avoid a waste of unused buffer memory capacity, also the buffer memory capacity MAX may be lowered accordingly.

On the other hand, the buffer capacity or buffer lengths, respectively, is defined under consideration of the fact that the buffer must be able to handle network delay variations. Consequently, the buffer capacity has to be set to such a value that more data than the data amount delayed during the network delay are buffered therein. Stated in other words, the data amount stored in the buffer is required to be large enough that data can continuously be read out therefrom during the network delay. Network delay variations occurring in ATM networks are caused by ATM switch buffers (and in CBR service [CBR=constant bit rate] typically correspond to 100–200 cells). Therefore, typical delay variations at a 155 Mbit/s ATM link through one ATM switch are in the range of below 2 ms. This value is obtained when assuming a delay of 200 ATM cells, each cell comprising 160 samples in 8 bit representation (non-linear presentation according to A-law coding having the same dynamics as 13 bit linear system) being transmitted via a 155 Mbit/s ATM link using the equation $$\text{delay}(ms) = (number\_of\_cells * 160 \text{ samples} * 8 \text{ bit}) / 155 \text{ Mbit/s},$$

which delay variations will add up when the transmitted data pass more than one ATM switch.

At a sound sample rate of 8 kHz, a delay of 2 ms corresponds to 16 samples to be buffered. Therefore, dependent on the number of ATM switches the data passes, the lower limit BLL and/or LL should be set to a value corresponding to the multiple of the number of ATM switches to be passed and the data amount of 16 samples, in order that an underflow may not occur in the buffer due to network variations.

Although specific numeric values for the limits AUL, UL, LL, BLL and the buffer memory capacity MAX have been given herein above, it has to be noted that these are only intended for illustrating the principles of determination of buffer capacity MAX and setting of upper and lower limits AUL, UL, LL, BLL and are mere examples. In particular, those values may vary depending on specific application parameters in a respective telecommunication system in which the present invention is implemented.

By means of the above described methods, degradation of speech quality can effectively be suppressed to an unnoticeable degree, while due to the selective dropping/duplication of TRAU frames, the voice sample rate adaptation in a telecommunication system can be effectively performed without necessitating any further synchronization like a common clock source.

It should be understood that the above description and accompanying figures are only intended to illustrate the present invention by way of example only. The method according to the present invention may, however, also be used in telecommunication systems other than the described GSM system. The preferred embodiments of the method may thus vary within the scope of the attached claims.

What is claimed is:

1. A method for sample rate adaptation in a telecommunication system, the method comprising the steps of:
supplying a first data stream of data cells via a network operated at a first sample rate;
passing said first data stream through a data modifying means;
outputting said first data stream as output data out of said data modifying means to a processing element;
storing said output data in said processing element; and
outputting said output data from said processing element as a second digital data stream at a second sample rate, said first and said second sample rate being different from each other;
detecting a state of said processing element, wherein said state of said processing element detected represents an amount of data stored in said processing element, and wherein said detecting step comprises the steps of:
comparing a current amount of data stored in said processing element with a lower limit and an upper limit of respective admissible data amounts stored in said processing element, and
setting said state of said processing element
to a first value in case a detected actual amount of stored data exceeds the upper limit,
to a second value in case the detected actual amount of stored data is below the lower limit, and
to a third value in case the detected actual amount of stored data is found to be between the lower limit and the upper limit; and
controlling said data modifying means dependent on the state of the processing element detected, wherein said controlling step controls said data modifying means to be enabled if said detected state has said first or said second value, and to be disabled if said detected state has said third value.

2. A method according to claim 1, wherein said controlling step further comprises the steps of:
discarding data cells passed through said data modification means to thereby not be supplied to said processing means if said state has said first value,
duplicating data cells passed through said data modification means to thereby be supplied plural times to said processing means if said state has said second value, and
leaving the number of data cells passed through said data modification means unchanged and supplying the data cells to said processing means unchanged if said state has said third value.

3. A method according to claim 2, wherein, in said controlling step, a data cell discarded or duplicated is a data cell transmitted immediately after setting of the status of said processing element to said first or second value, respectively.

4. A method according to claim 2, wherein, in said controlling step, a data cell discarded or duplicated is a detected empty data cell transmitted within a predetermined time interval after setting of the state of said processing element to said first or second value, respectively.

5. A method according to claim 2, wherein, in said controlling step, a data cell discarded or duplicated is a detected empty data cell transmitted among a predetermined number of data cells after setting of the state of said processing element to said first or second value, respectively.

6. A method according to claim 4, wherein, in said controlling step,
if no empty cell is detected and the amount of data stored in said processing element is detected to exceed a limit above said upper limit or to be below a limit below said lower limit,
then a cell following that detection that the amount of data stored in said processing element exceeds said limit above said upper limit or is below said limit below said lower limit, is discarded or duplicated, respectively, irrespective of whether it is an empty cell or not.

7. A device for sample rate adaptation in a telecommunication system, the device comprising:
- a data modifying means, through which a first stream of data cells supplied via a network operated at a first sample rate is passed;
- a processing element to which said data stream passed through said data modifying means is input and stored, said data stream being output from said processing element as a second digital data stream at a second sample rate, with said first and said second sample rate being different from each other;
- a detection means for detecting a state of said processing element, said detection means including means for detection of a state of said processing element, wherein said state of said processing element detected represents an amount of data stored in said processing element, and wherein said means for detection comprises:
  - means for comparing a current amount of data stored in said processing element with a lower limit and an upper limit of respective admissible data amounts stored in said processing element, and
  - means for setting said state of said processing element
    - to a first value in case a detected actual amount of stored data exceeds the upper limit,
    - to a second value in case the detected actual amount of stored data is below the lower limit, and
    - to a third value in case the detected actual amount of stored data is found to be between the lower limit and the upper limit; and
- a control means for controlling said data modifying means dependent on the detected state of the processing element, wherein said control means includes means for controlling said data modifying means to be enabled if said state detected has said first or said second value, and to be disabled if said state detected has said third value.

* * * * *